US 12,050,968 B1

United States Patent
Tripp et al.

(10) Patent No.: US 12,050,968 B1
(45) Date of Patent: Jul. 30, 2024

(54) DETECTING, AND RECOMMENDING FIXES FOR, INSUFFICIENT VALIDATION OF USER INPUTS IN COMPUTER SOFTWARE

(71) Applicant: Amazon Technologies, Inc., Seattle, WA (US)

(72) Inventors: Omer Tripp, San Jose, CA (US); Qiang Zhou, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1056 days.

(21) Appl. No.: 16/694,925

(22) Filed: Nov. 25, 2019

(51) Int. Cl.
*G06N 20/00* (2019.01)
*G06N 7/01* (2023.01)

(52) U.S. Cl.
CPC ............... *G06N 20/00* (2019.01); *G06N 7/01* (2023.01)

(58) Field of Classification Search
CPC ........ G06N 20/00; G06N 20/10; G06N 20/20; G06N 7/005; G06N 7/02; G06N 7/04; G06N 5/04; G06N 5/02; G06F 8/72; G06F 11/3604; G06F 11/36; G06F 11/3616
See application file for complete search history.

(56) References Cited

U.S. PATENT DOCUMENTS

2019/0266070 A1* 8/2019 Bhandarkar ........ G06F 11/3072

OTHER PUBLICATIONS

Shar et al. "Web Application Vulnerability Prediction Using Hybrid Program Analysis and Machine Learning" Nov. 2014 https://ieeexplore.ieee.org/abstract/document/6963442 (Year: 2014).*
Medeiros et al. "Automatic Detection and Correction of Web Application Vulnerabilities using Data Mining to Predict False Positives" Apr. 2014 https://dl.acm.org/doi/pdf/10.1145/2566486.2568024 (Year: 2014).*
Deepa et al. "Securing web applications from injection and logic vulnerabilities: Approaches and challenges" Mar. 2016 https://www.sciencedirect.com/science/article/pii/S0950584916300234 (Year: 2016).*
Gupta et al. "Text-mining based predictive model to detect XSS vulnerable files in web applications" Dec. 2015 https://ieeexplore.ieee.org/abstract/document/7443332 (Year: 2015).*

* cited by examiner

*Primary Examiner* — Omar F Fernandez Rivas
*Assistant Examiner* — Tri T Nguyen
(74) *Attorney, Agent, or Firm* — Nicholson De Vos Webster & Elliott LLP

(57) ABSTRACT

Techniques for analyzing code are described. In some instances, a code analysis service is implemented by one or more electronic devices, the code analysis service including instructions that upon execution cause the code analysis service to: perform a program analysis to mine a code segment of the stored code to generate a descriptor of each input in the code segment that appears to be have insufficient input validation; assess that an input has insufficient validation and determining a classification of input validation to use by determining a category of input validation to apply to the input; acquire suggestion for the determined category; and provide the acquired suggestion for the determined category.

20 Claims, 10 Drawing Sheets

```
PUBLIC VOID EVALUATEQUERY(FINAL STRING QUERY) {
 final ResultSet rs = db.processQuery(query);
 ...
}
```
CODE SNIPPET
301
```
PUBLIC VOID EVALUATEQUERY(FINAL STRING QUERY) {
 VALIDATESANSSQLMARKUP(QUERY);
 FINAL RESULTSET RS = DB.PROCESSQUERY(QUERY);
 ...
}
```
CODE SNIPPET
303
*FIG. 3*

```
IMARKOVCHAINEXTRACTOR.MARKOVCHAIN(
701  METHODSIGNATURE=TYPE:STRING,
     LINKEDDATA=[FILENAME:/DATA2/GIT_REPOS/D0014126/IMAGE-SERVER/SRC/MAIN/JAVA/COM/
     JTHINKING/IMAGE/WEB/CONTROLLER/IMAGECONTROLLER.JAVA,
     PACKAGE:D0014126:0E530FB9818C3E9F2DB2CA75D8F59CB4B21D133C,
     NNODES:59,
703  NTHROWS:0,
705  NCALLS:14,
707  ISPRIVATE:FALSE,
709  MNAME:IMAGECONTROLLER.IMAGETHUMBNAIL#HTTPSERVLETRESPONSE#STRING#INTEGER#INTEG
     ER#INTEGER#,
711  MANNOTATION:@REQUESTMAPPING("/IMAGETHUMBNAIL"),
713  CANNOTATION:@CONTROLLER,
715  NPARAMS:5,
717  MMODIFIERS:1,
719  CMODIFIERS:1,
721  B-USE:DOWNLOADSERVICE.IMAGETHUMBNAIL()#55,
723  V-USE:STRING.ENDSWITH()#48,
     V-USE:STRING.ENDSWITH()#48,
     V-USE:STRING.ENDSWITH()#48,
     V-USE:STRING.ENDSWITH()#48,
     V-USE:STRING.ENDSWITH()#50,
     V-USE:STRING.ENDSWITH()#50,
     V-USE:STRING.ENDSWITH()#52,
     V-USE:STRING.ENDSWITH()#52,
725  N_USERS:9,
     N_OTHER:9,
727  NAME:RELURL,
729  PIDX:1,
731  VALIDATED:TRUE],
     METADATA=[NULL, NULL, NULL, NULL, NULL, NULL, NULL, NULL, NULL, NULL, NULL, NULL, NULL, NULL,
     NULL, NULL, NULL, NULL, NULL, NULL, NULL, NULL, NULL, NULL, NULL, NULL,
733  VALIDATION:STRING.ENDSWITH()#48])
     SEP_TOKEN
```

*FIG. 7*

DETECTING, AND RECOMMENDING FIXES FOR, INSUFFICIENT VALIDATION OF USER INPUTS IN COMPUTER SOFTWARE

BACKGROUND

Input validation is the process of validating the input to an application before using it. Input validation is important for application security and most application risks involve tainted input at some point. Input validation may be applied on both a syntactical and a semantic level.

BRIEF DESCRIPTION OF DRAWINGS

Various embodiments in accordance with the present disclosure will be described with reference to the drawings, in which:

FIG. 3 illustrates examples of insufficient input validation and better input validation.

FIG. 7 illustrates an exemplary descriptor for a method.

DETAILED DESCRIPTION

The present disclosure relates to methods, apparatus, systems, and non-transitory computer-readable storage media for determining when code has insufficient input validation and attempting to determine a fix or suggestion for providing sufficient input validation.

Input validation is performed to ensure only properly formed data is entering the workflow in an information system, preventing malformed data from persisting in a database, and triggering malfunction of various downstream components. Input validation should happen as early as possible in the data flow, preferably as soon as the data is received from the external party. Data from all potentially untrusted sources should be subject to input validation, including not only Internet-facing web clients but also backend feeds over extranets, from suppliers, partners, vendors or regulators, each of which may be compromised on their own and start sending malformed data. In some cases, programmers do not know Unfortunately, most developers are unfamiliar with the threats due to missing or insufficient validation. As such, there is strong motivation for automated methods to detect and assist in fixing such holes. Detailed herein are embodiments where program code is analyzed to develop a description of the code with respect to at least the inputs of the code and the description of the code is then subjected to one or more machine learning models to determine a potential fix or suggested fix for any insufficient input validation. This hybrid approach—combining machine learning and program analysis—allows for code to be checked whether or not a programmer has the requisite knowledge to identify or fix input validation issues.

Figure 1:
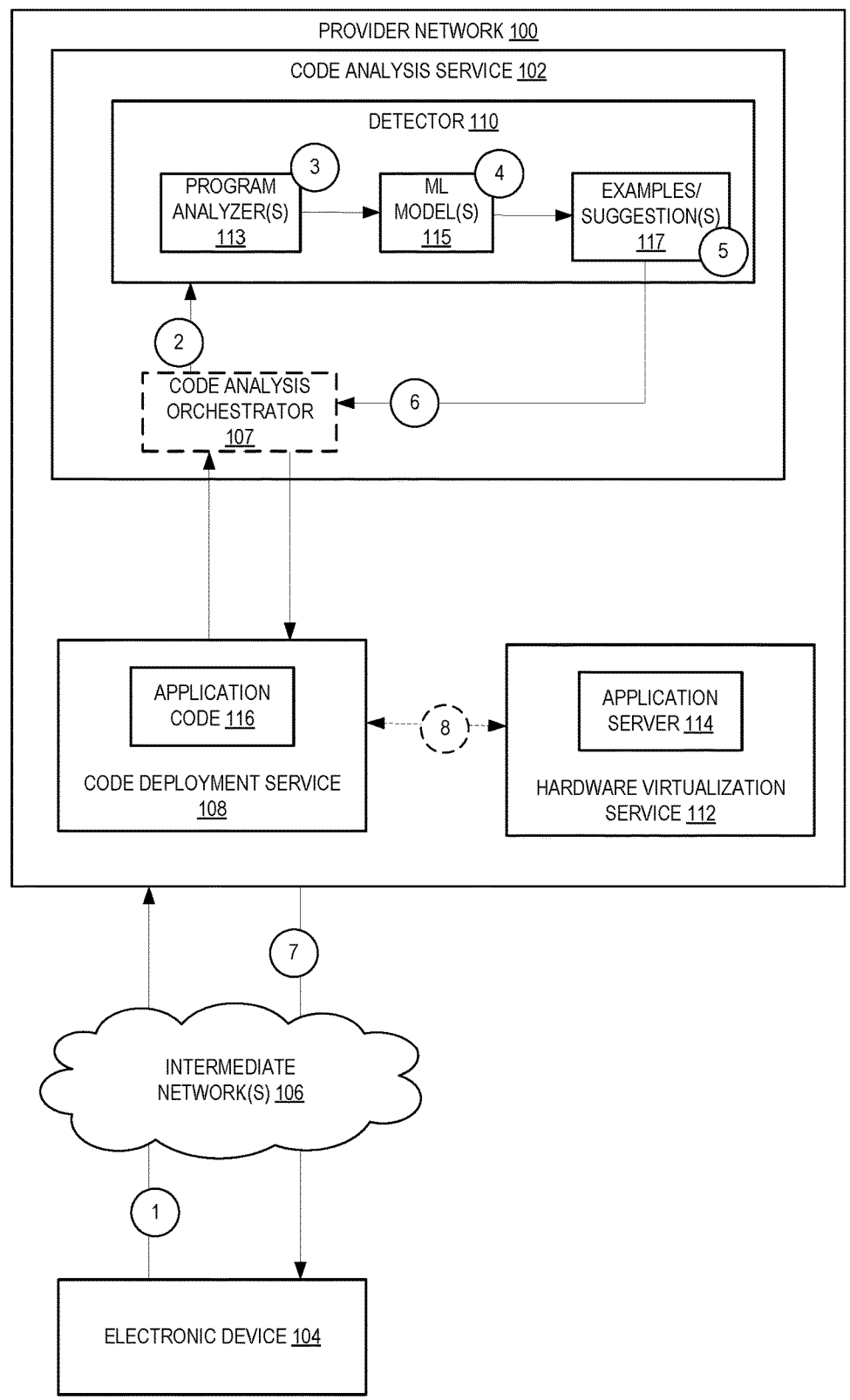
FIG. 1 illustrates embodiments of systems that include a code analysis service of a provider network.

FIG. 1 illustrates embodiments of systems that include a code analysis service of a provider network. A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand. Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

As shown in FIG. 1, the provider network 100 includes a code analysis service 102 which may be used to find insufficient input validation in code and/or attempt to suggest a way of performing sufficient input validation for the code. Note that insufficient validation may be no validation in some embodiments and not adequate validation in other embodiments. In particular, in some embodiments, a detector 110 of the code analysis service 102 is used to analyze code to look for input validation issues and/or make suggestions for input validation issues.

A detector 110 logically includes one or more program analyzers 113, one or more ML models 115, and storage for one or more code examples or suggestions storage 117. A program analyzer inspects code segments (such as code segments of application code 116) to determine when it appears that input validation is missing. Note different program analyzers may be used for different types of program code (e.g., C++, JAVA, etc.) A program analyzer 113 may check, per input, for at one or more of at least: control dependence (e.g., if x, then y), pattern matching (e.g., checking a string against a whitelist; checking a string for terms commonly used in input validation such as verify, NULL, empty, valid*, error, etc. which may indicate the use of a validation routine; etc.), and/or determining if the input is used as a part of a Boolean expression (wherein when a Boolean expression is used it is more like that there is input validation), etc.

In some embodiments, a program analyzer 113 generates a descriptor (e.g., a feature vector) of known aspects of a suspected insufficient validation based upon the checks detailed above and the analyzed code. The descriptor may include one or more of: a type of parameter, annotations in the code, an indication of if the code is public (e.g., external facing) or private, exceptions, a number of parameters, a number of uses for parameters, a number of nodes, an indication of the code being analyzed, etc. In other embodiments, a program analyzer generates a description for all inputs.

In some instances, the program analyzer 113 evaluates other parameters of the code to determine how other methods, etc. of the code are treated. In some embodiments, when other parameters are not detected, then no further processing (e.g., the application of ML models 115 detailed below) is performed.

An output of a program analyzer (e.g., the descriptor) is fed into one or more machine learning (ML) models 115 to assess the code with respect to the input. These machine learning model or models determine(s) from the description if there is insufficient (e.g., missing) input validation and, when insufficient, what type or category of input validation should be used. Note that in some embodiments a threshold may be applied to determine how insufficient input validation needs to be before the code using the input is evaluated. For example, in some cases any sort of validation will be deemed acceptable and in other cases the validation is checked for completeness.

In some embodiments, a first ML model intakes the descriptor and classifies if it needs validation. For example, a binary classifier is used. When validation is determined to be needed, the descriptor is processed by another binary classification to determine if the needed validation is well-known. In some embodiments, a second ML model makes this determination. When not well-known, the typical notification is that there may be missing input validation, but no suggestion as to what to use.

For well-known validation types, a multinomial classification is performed to determine what category of well-known validation should be utilized. In some embodiments, a third ML model makes this determination. In some embodiments, the category is used as a lookup of stored input validation examples or suggestions storage 117. The lookup may use information from the descriptor to find more similar code examples. Note that one or more of the first classifications may not occur, but a classification of well-known types of validation would still be made using the third ML model.

In some embodiments, external code is more heavily scrutinized with a lean toward suggesting input validation by the ML models. External code may be determined from the code have multiple inputs that perform a lot of checks, be explicitly designated as such, etc.

As shown, the code analysis service 102 includes a code analysis orchestrator 107 in some embodiments. When a code analysis orchestrator 107 is included with the service 102, it performs one or more of the following: configures the detector 110, provides requests for analysis to the detector 110, handles responses from the detector 110, etc. Additionally, in some embodiments, the code analysis orchestrator 107 receives outputs from each of the components of the detector 110 and feeds information to the next component (as needed) in the detector 110.

In some embodiments, the code analysis orchestrator 107 receives configuration parameters to configure usage of the detector 110. Examples of configuration parameters include, but are not limited to: an identification of a detector to use (when multiple detectors are present), an identification of what program analyzer 113 or ML models 115 to use (e.g., based on the code type), a storage location(s) of results, etc.

Note that while a single detector 110 is shown with one or more program analyzer(s) 113, one or more ML model(s) 115, and storage for examples or suggestions storage 117, in some embodiments, the code analysis service 102 includes a plurality of detectors. For example, a detector for JAVA code, a detector for C++ code, etc.

As shown, in some embodiments, the provider network 100 includes a code deployment service 108 used to deploy application code 116 (the code that is analyzed) in a hardware virtualization service 112 using one or more application servers 114.

Circles with numbers inside indicate an example of a flow for inference using the code analysis service 102. At circle 1, electronic device 104 sends a request to the provider network 100 to analyze application code 116. The code analysis service 102 receives this request and calls the code analysis orchestrator 107 to process the request.

At circle 2, the code analysis orchestrator 107 calls a detector 110 (as dictated by the request) to analyze the application code 116. The called detector analyzes the application code to potentially generate a descriptor of input usage at circle 3.

One or more ML models 115 utilize the generated descriptor (and/or an output of a ML model) to assess the need for input validation, what type of validation, and what category of validation per type (as needed) at circle 4. When a well-known category if input validation is known, one or more suggestions are pulled at circle 5 and returned to the code analysis orchestrator 107 at circle 6.

The code analysis orchestrator 107 takes that suggestion and provides it to requesting electronic device 104 at circle 7. The code analysis orchestrator 107 also provides an indication of what input should be validated in the code. Once changes have been made, the application code 116 is deployed at circle 8 in some embodiments.

Figure 2:
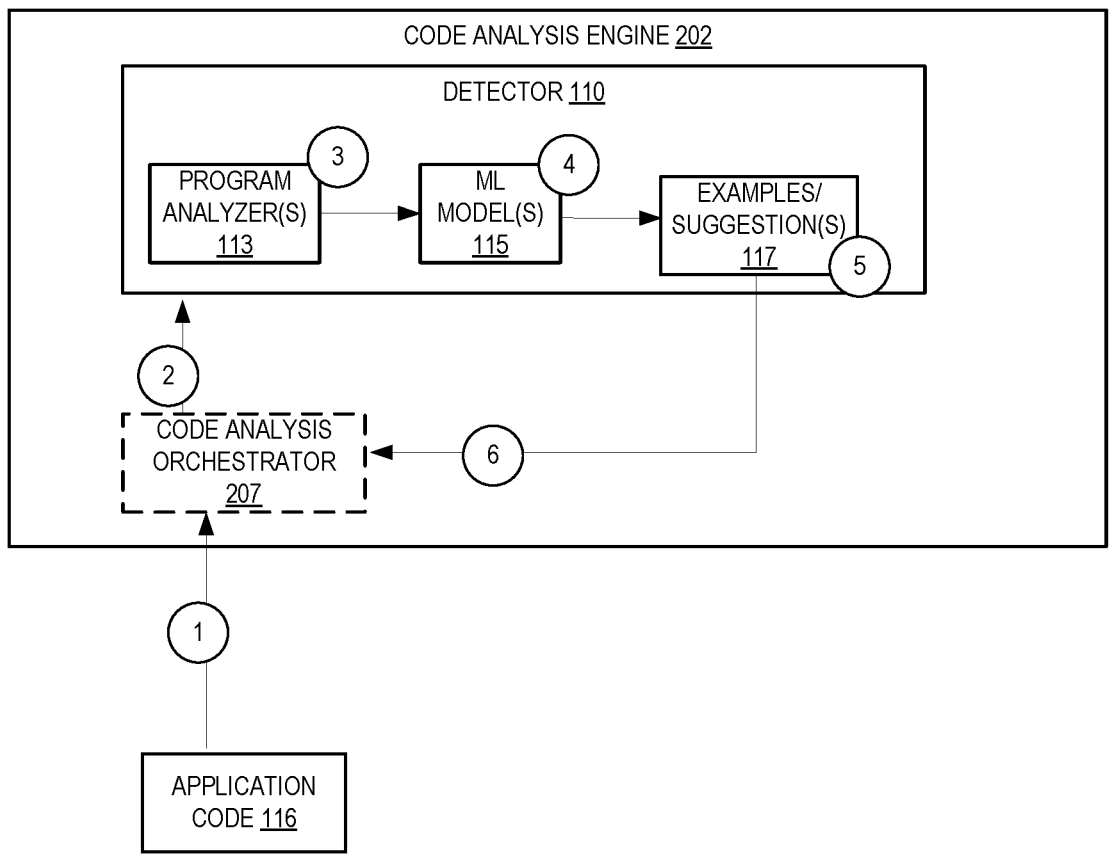
FIG. 2 is a diagram illustrating an environment including a code analysis engine.

FIG. 2 is a diagram illustrating an environment including a code analysis engine. The code analysis engine 202 may be used to find insufficient input validation in code and/or attempt to suggest a way of performing sufficient input validation for the code. This code analysis engine 202 is not provided by a provider network such as that detailed in FIG. 1. Where the reference numbers are the same as in FIG. 1 the same or similar functionality as detailed above. In this example, the code analysis orchestrator 207 may operate differently in that formats of requests, etc. may be different that in a provider network.

Circles with numbers inside indicate an example of a flow for inference using the code analysis engine 202. At circle 1, the code analysis orchestrator 207 receives application code to analyze.

At circle 2, the code analysis orchestrator 207 calls a detector 110 (as dictated by the request) to analyze the application code 116. The called detector analyzes the application code to potentially generate a descriptor of input usage at circle 3.

One or more ML models 115 utilize the generated descriptor (and/or an output of a ML model) to assess the need for input validation, what type of validation, and what category of validation per type (as needed) at circle 4. When a well-known category if input validation is known, one or more suggestions are pulled at circle 5 and returned to the code analysis orchestrator 207 at circle 6. The code analysis orchestrator 207 takes that suggestion and provides it to a requestor.

FIG. 3 illustrates examples of insufficient input validation and better input validation. In the code snippet 301, there is not validation of the string query. The database query is simply processed and returned. There is no check performed to determine if the query is properly formatted, etc. In code snippet 303, a validation of the input string query is performed using method "validateSansSqlMarkup". After this validation is performed, then the database query is processed.

Figure 4:
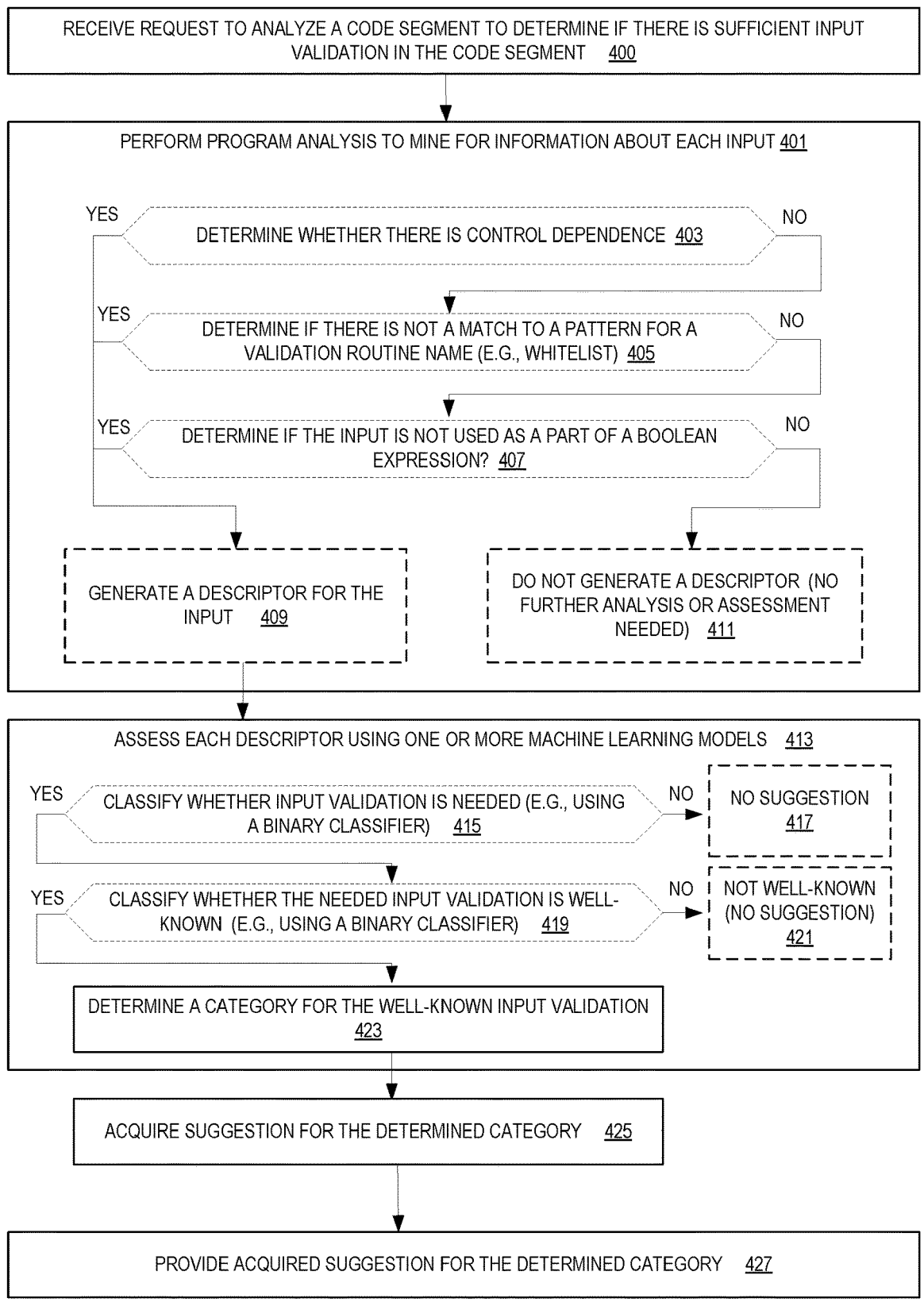
FIG. 4 is a flow diagram illustrating operations of a method for detecting insufficient validation in code and, if possible, suggesting improvements to use in the code according to some embodiments.

FIG. 4 is a flow diagram illustrating operations of a method for detecting insufficient validation in code and, if possible, suggesting improvements to use in the code according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the code analysis service 102 or code analysis engine 203 of the other figures.

At 400, at request to analyze a code segment is received. This request may be received by a code analysis orchestrator 107 or 207, if used, or more directly by the detector 110. The request may include one or more of: code to be analyzed, a pointer to code to be analyzed, a location to store a result of the analysis, etc.

Program analysis of the code segment is performed at 401. In some embodiments, this is performed by the program analyzer 113. The program analysis mines the inputs and determines when the inputs satisfy one or more conditions that may indicate insufficient input validation. Note the order of conditional checks may be different from that shown, more checks may be used, and one or more conditional checks may be performed in parallel.

In some embodiments, the program analysis includes determining whether there is a control dependence using the input at 403. For example, is there something that is dependent upon the input (e.g., if X, then Y). These types of conditional statements indicate there should be a check of X.

In some embodiments, the program analysis includes determining whether there is not a validation routine using the input at 405. For example, is the input subjected to a routine whose name includes string commonly associated with validation prior to use. Exemplary strings include, but are not limited to: NULL, empty, check, valid, error, verify, etc.

In some embodiments, the program analysis includes determining whether the input is not used as a part of a Boolean expression at 407. For example, X AND Y where X is an input to be validated. Usage of a Boolean expression may indicate a validation is being done.

When there is an indication that at least one of the checks indicates that input validation may not be being used, a descriptor of known aspects of the input is generated at 409. This descriptor may include an indication of what caused the generation. When there is not an indication of at least one of the checks indicates that input validation may not be being used, a descriptor of known aspects of the input is not generated at 411. Note this example is more generally applicable to a binary representation of input validation . . . either it is being used or it is not. In some embodiments, threshold is applied to determine even if there is an indication of validation that a further assessment is warranted. For example, if other inputs are subjected to more stringent validation then it may be beneficial to see if a particular input should be evaluated further to determine if its apparent validation is sufficient.

A generated descriptor is fed into one or more machine learning models at 413 and the descriptor is assessed to attempt to determine at least a category for a well-known input validation to potentially be applied. In some embodiments, one or more of other machine learning models may be applied to determine 1) whether input validation is needed and/or 2) if the input validation type is well-known; and 3) input validation may be syntactical (e.g., on the syntax of the data) and/or semantic (e.g., correctness of values).

At 415, a classification of whether input validation is needed is performed using the descriptor in some embodiments. In some embodiments, this classification is performed using a ML binary classifier. When the classification indicates that no input validation is needed, no suggestion for input validation will be needed and the assessment ends at 417.

When input validation is determined to be needed, another classification is made to determine whether the needed input validation is well-known at 419 in some embodiments. In some embodiments, this is performed using a second ML binary classifier. Well-known categories of input validation include, but are not limited to: a data type validation, a validation against a schema (e.g., JSON or XML), a type conversion check, a range check, a check against allowed strings, a validation of free-form text (e.g., normalization, character whitelisting, etc.), a file verification, a location verification (e.g., URL check), a content check (e.g., prefix and suffix based checks), a NULL/emptiness check, a comparison check, a membership check, a bounds check, and a check for the proper use if regular for structured data. When the classification indicates that the input validation not well-known, then no suggestion for input validation is provided and the assessment ends at 421.

When determined input validation is well-known, a determination of which category the well-known input validation belongs to is made at 423. This determination may be made without doing either of the previous checks in some embodiments. This is performed using a mutinomial (multiclass) classifier. This determination is based on at least the generated descriptor.

A suggestion is acquired for the determined category at 425. This acquisition may come in the form of a category lookup (such as into examples or suggestions storage 117) for a suggested fix or sample code.

At 427, the acquired suggestion for the determined category is provided. For example, the acquired suggestion is provided to the party that requested the analysis.

Figure 5:
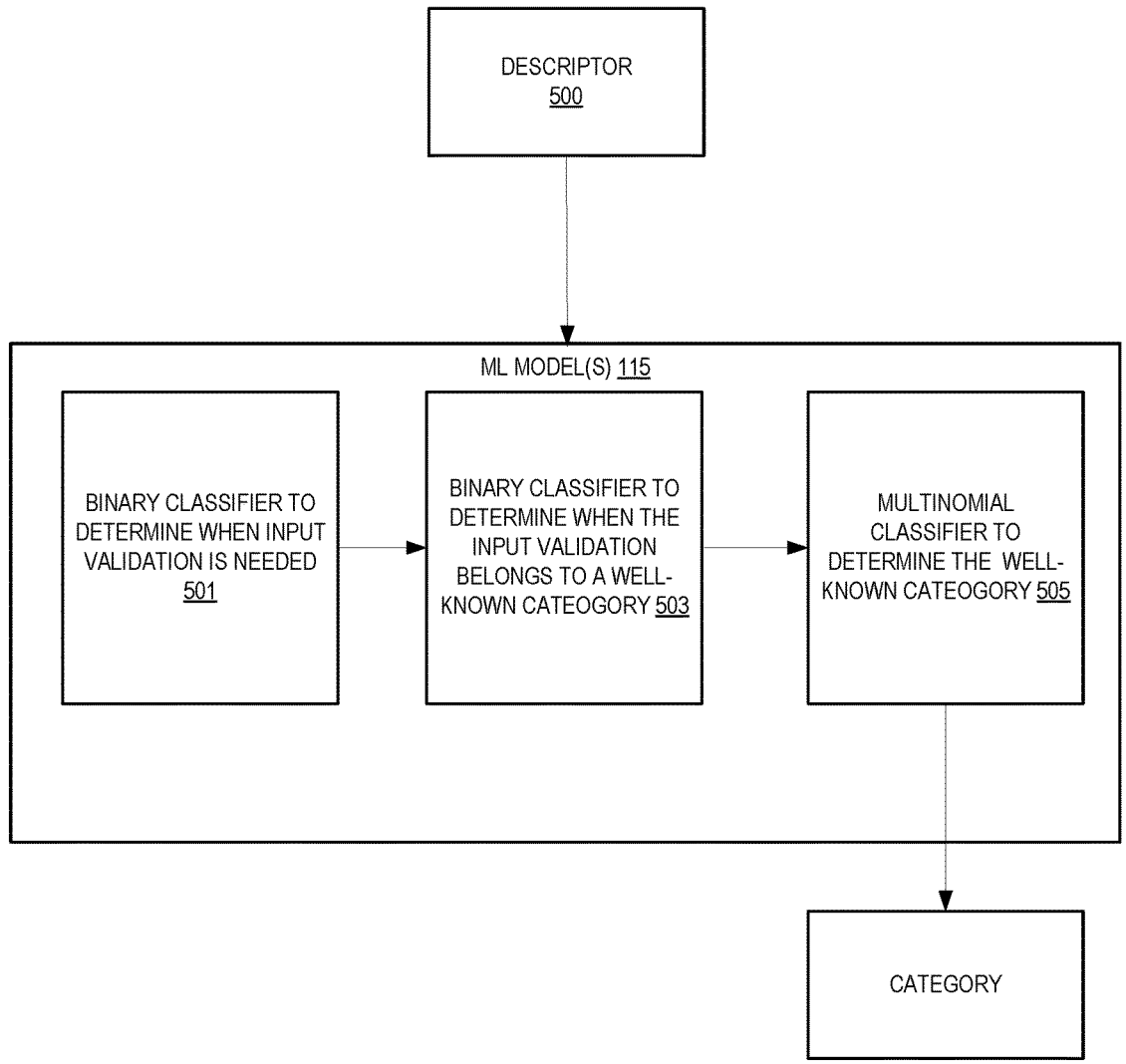
FIG. 5 illustrates embodiments of ML models to be used during the assessment of an input.

FIG. 5 illustrates embodiments of ML models to be used during the assessment of an input. In particular, the input descriptor 500 is assessed using these models 115. The first ML model 501 is a binary classifier which determines when input validation is needed. As noted above, this ML model 501 produces a binary result—either input validation is needed or it is not needed.

When input validation is needed, a second ML model 503 that is also a binary classifier determines when the input validation belongs to a well-known category such as those detailed above. In some embodiments, the descriptor 500 is passed from the first ML model 501 to the second ML model 503. In other embodiments, the second ML model 503 more directly acquires the descriptor 500.

When the input validation is well-known, a third ML model 505 that is a multinomial classifier determines what category the input validation belongs to. In some embodiments, the descriptor 500 is passed from the second ML model 503 to the third ML model 505. In other embodiments, the second ML model 503 more directly acquires the descriptor 500. The category can be used to look up a suggested fix or sample code.

Figure 6:
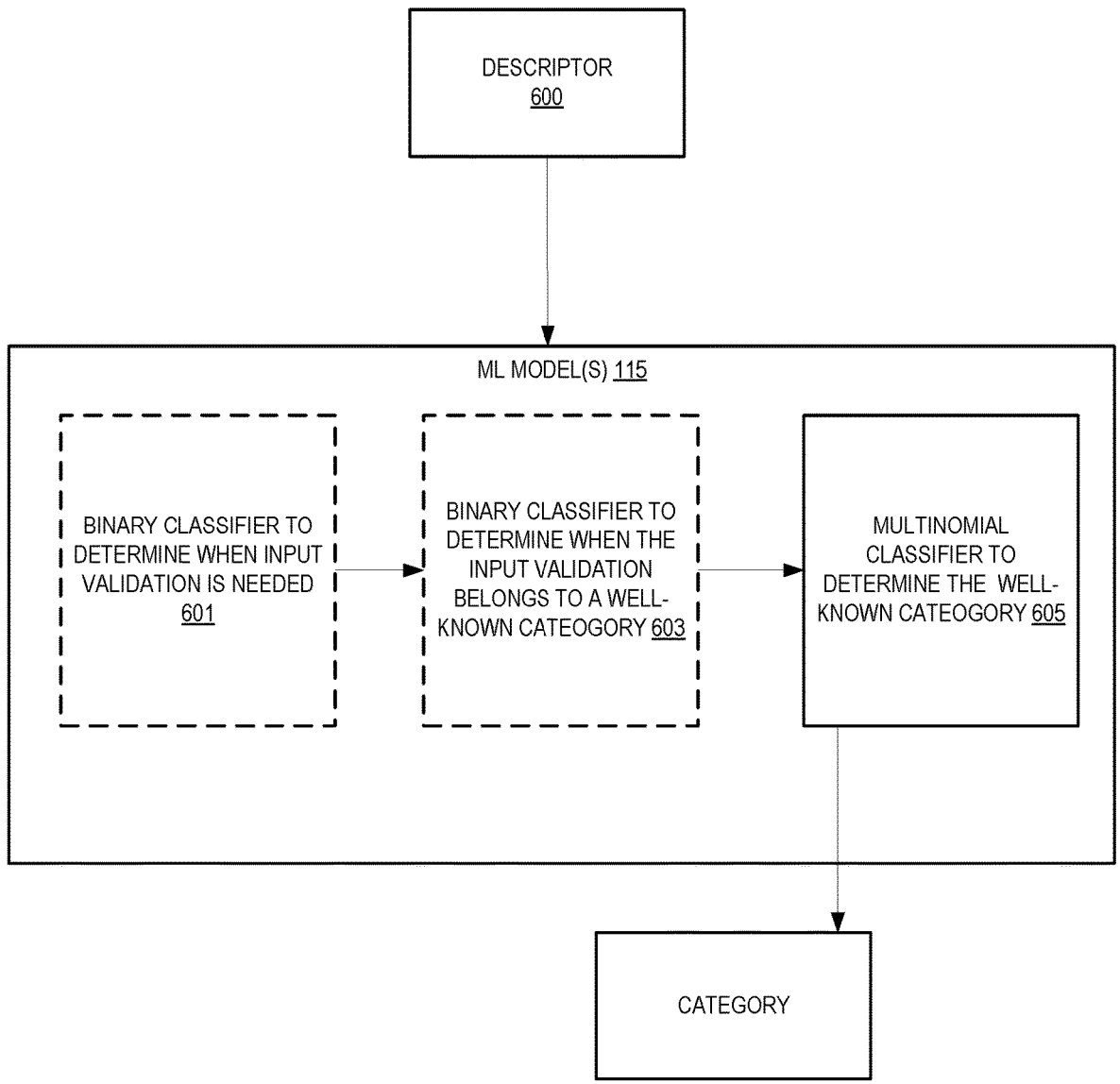
FIG. 6 illustrates embodiments of ML models to be used during the assessment of an input.

FIG. 6 illustrates embodiments of ML models to be used during the assessment of an input. In particular, the input descriptor 600 is assessed using these models 115. This figure is different than FIG. 5 in that one or more of the first ML model 601 or the second ML model 603 is not utilized.

FIG. 7 illustrates an exemplary descriptor for a method. In particular, this descriptor is for one of the inputs named RELURL (shown with lead line 727). This input has a string type shown at 701. The method's name is shown in MNAME 709 along with the parameter types of the method (HTTPSERVLETRESPONSE, STRING, INTEGER, INTEGER, INTEGER). Note that string is the second of the parameters which is shown in the parameter location identifier 729 (the value is 1 as the count starts from 0).

NTHROWS 703 details how many types of exceptions are thrown by the method and NCALLS 705 details the number of method calls by the method. An indication of if the method is private is shown by ISPRIVATE 707. As noted above, private methods are more trusted.

MANNOTATION 711 describes the annotations in the method and CANNOTATION 713 details the annotations of the method's class.

NPARAMS 715 details the number of parameters in method (5 as noted above). NMODIFIERS 717 is the number of modifiers in the method, whereas CMODIFIERS 719 is the number of modifiers of the method's class.

Use of the parameter are detailed by B-USE 721 and V-USE 723. V-USE 723 details the operations on a parameter that may be performing some sort of input validation. B-USE 721 are some other operations of the parameter.

NUSERS 725 details the number of uses of input parameter.

An indication of if the parameter is validated is provided as VALIDATED 731. In this example, the parameter is validated. The VALIDATION 733 field indicates how the parameter was validated.

Figure 8:
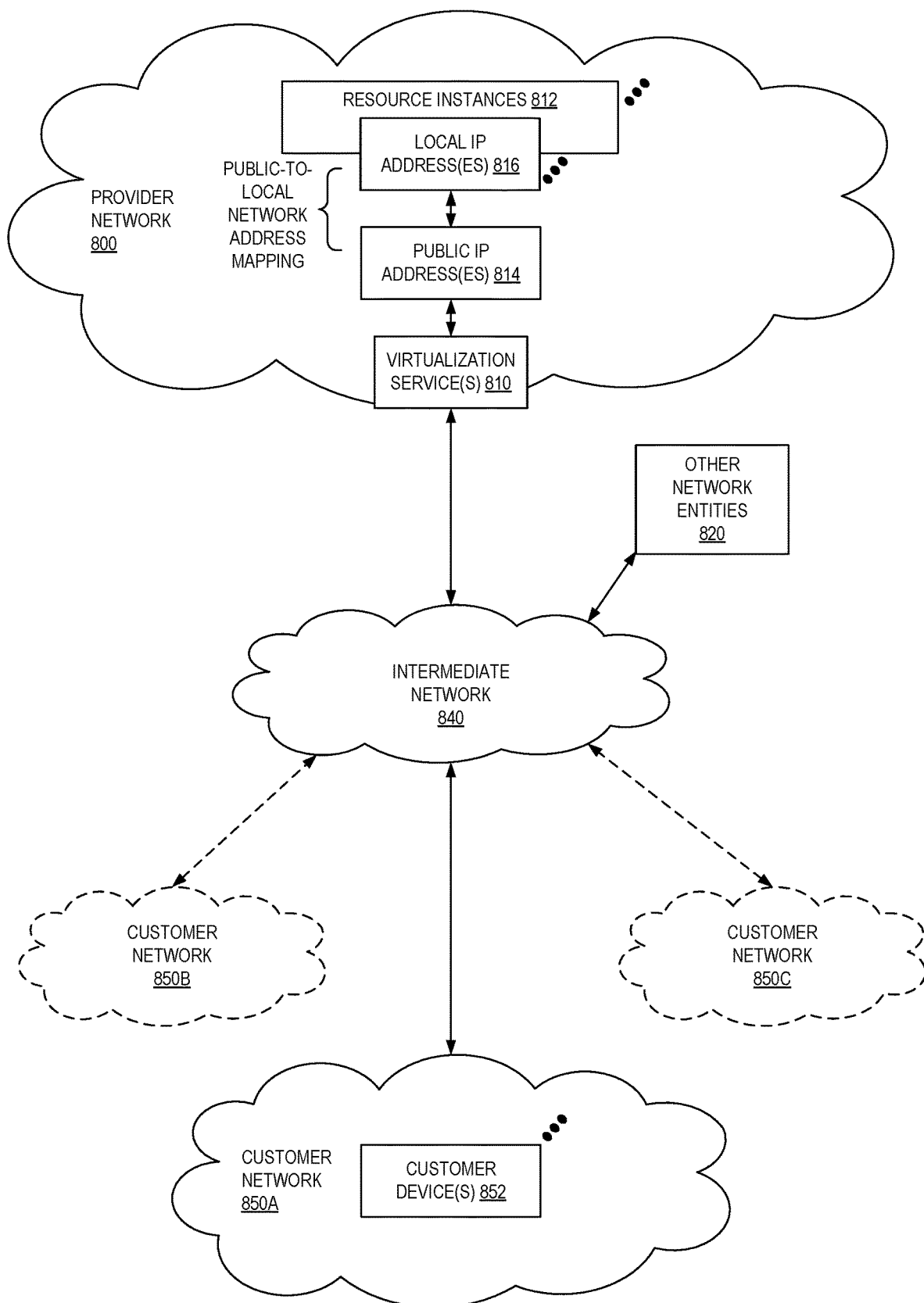
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
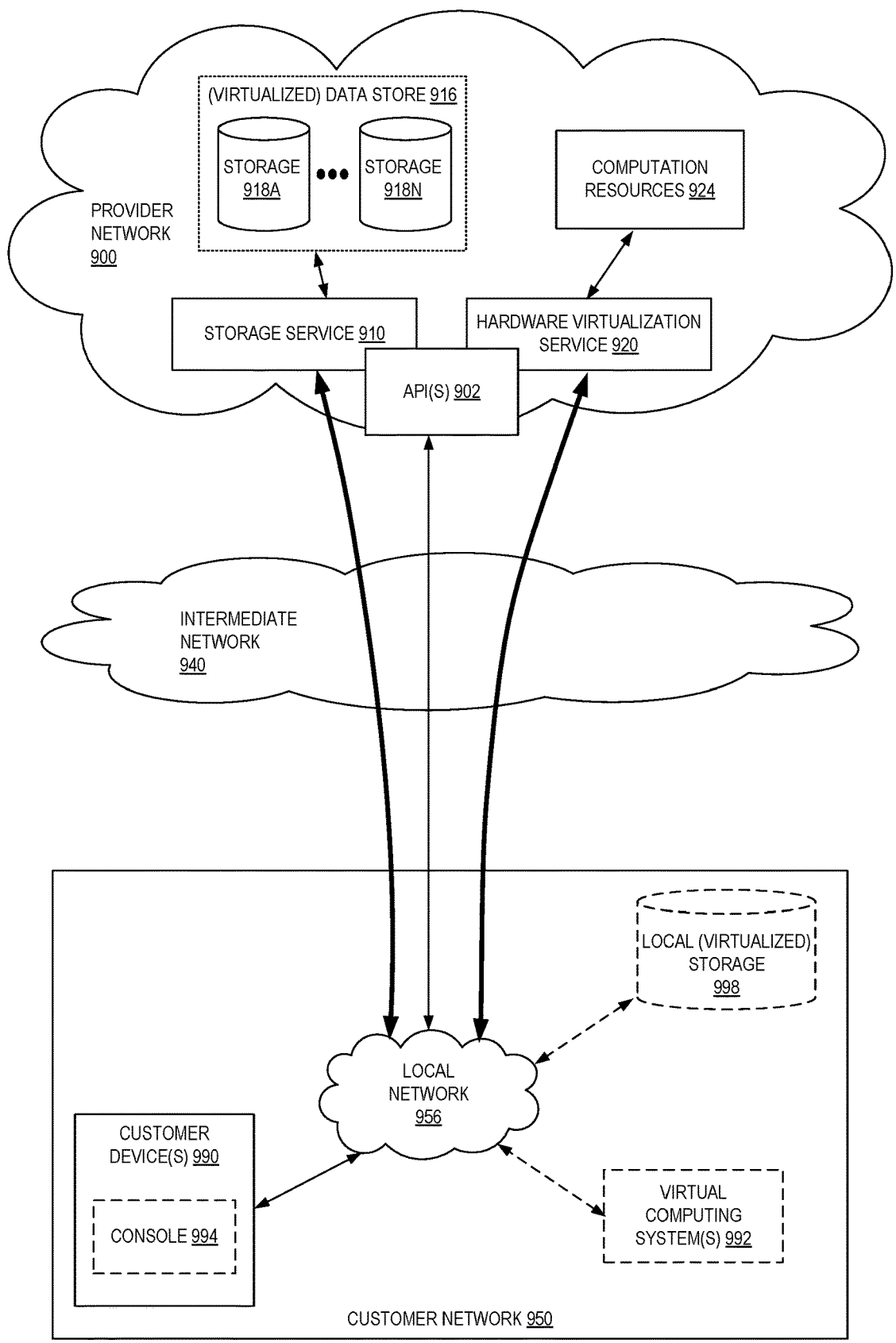
FIG. 9 is a block diagram of an example provider network that provides a storage service and a hardware virtualization service to customers according to some embodiments.

FIG. 9 is a block diagram of an example provider network that provides a storage service and a hardware virtualization service to customers, according to some embodiments. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage service 910, for example via one or more APIs 902, to access data from and store data to storage resources 918A-918N of a virtual data store 916 (e.g., a folder or "bucket", a virtualized volume, a database, etc.) provided by the provider network 900. In some embodiments, a virtualized data store gateway (not shown) may be provided at the customer network 950 that may locally cache at least some data, for example frequently-accessed or critical data, and that may communicate with storage service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Illustrative Systems

Figure 10:
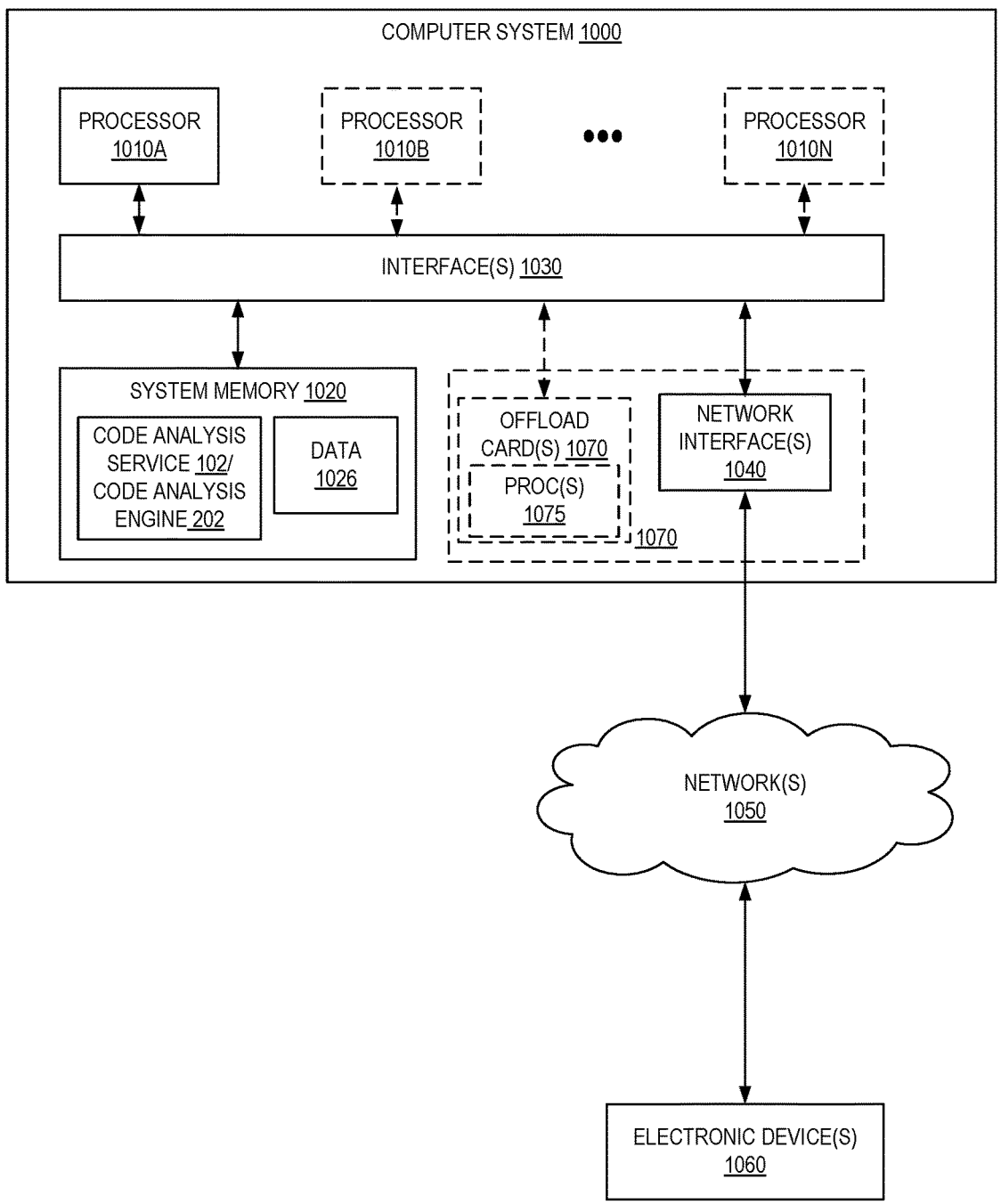
FIG. 10 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the ×86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1020 as code analysis service 102 (or code analysis engine 202) and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070 (including one or more processors 1075, and possibly including the one or more network interfaces 1040) that are connected using an I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1000 may act as a host electronic device (e.g., operating as part of a hardware virtualization service) that hosts compute instances, and the one or more offload cards 1070 execute a virtualization manager that can manage compute instances that execute on the host electronic device. As an example, in some embodiments the offload card(s) 1070 can perform compute instance management operations such as pausing and/or un-pausing compute instances, launching and/or terminating compute instances, performing memory transfer/copying operations, etc. These management operations may, in some embodiments, be performed by the offload card(s) 1070 in coordination with a hypervisor (e.g., upon a request from a hypervisor) that is executed by the other processors 1010A-1010N of the computer system 1000. However, in some embodiments the virtualization manager implemented by the offload card(s) 1070 can accommodate requests from other entities (e.g., from compute instances themselves), and may not coordinate with (or service) any separate hypervisor.

In some embodiments, system memory 1020 may be one embodiment of a computer-accessible medium configured to store program instructions and data as described above. However, in other embodiments, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle(R), Microsoft(R), Sybase(R), IBM(R), etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 918A-918N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a request to analyze a code segment for input validation;
   executing program analysis code on a computing device including a processor;
   passing the code segment as an input into the executing program analysis code, wherein the executing program analysis code:
      analyzes the code segment to determine that the code segment has possibly insufficient validation; and
      generates an output comprising a descriptor of possibly insufficient validation within the code segment, wherein the executing program analysis code generates the descriptor based on the input satisfying one or more conditions indicative of insufficient input validation, and wherein the one or more conditions include:
         a control dependence using the input,
         an absence to a match to a string pattern in a method name that typically indicates a validation is applied to the input, or
         the input not being used as a part of a Boolean expression;
   obtaining, from the executing program analysis code, the output;
   passing the descriptor through a first machine learning model that analyzes the descriptor to determine that input validation is needed;
   obtaining an output from the first machine learning model indicating that input validation is needed;
   passing the descriptor through a second machine learning model that analyzes the descriptor to determine that the input validation belongs to a known category of input validation functions;
   obtaining an output from the second machine learning model indicating that the input validation belongs to the known category of input validation functions;
   passing the descriptor through a third machine learning model that analyzes the descriptor to determine the known category of input validation functions to which the input validation belongs;
   obtaining an output from the third machine learning model indicating the known category of input validation functions to which the input validation belongs;
   performing a lookup against a data store to obtain a lookup result corresponding to a suggestion for the known category; and
   transmitting the suggestion for the known category to a destination electronic device.

2. The computer-implemented method of claim 1, wherein the descriptor includes an indication of a method that accepts the input, a type for the input, an indication of whether the method is private, and an indication of use of a parameter.

3. The computer-implemented method of claim 1, wherein the first machine learning model is a binary classifier, the second machine learning model is a binary classifier, and the third machine learning model is a multinomial classifier.

4. A computer-implemented method comprising:
   executing program analysis code on a computing device including a processor;
   passing a code segment as an input into the executing program analysis code, wherein the executing program analysis code:
      analyzes the code segment to determine that the code segment has possibly insufficient validation; and
      generates an output comprising a descriptor of possibly insufficient validation within the code segment, wherein the executing program analysis code generates the descriptor based on the input satisfying one or more conditions indicative of insufficient input validation;
   obtaining, from the executing program analysis code, the output;
   passing the descriptor through a first machine learning model that analyzes the descriptor to determine that input validation is needed;
   obtaining an output from the first machine learning model indicating that input validation is needed;
   passing the descriptor through a second machine learning model that analyzes the descriptor to determine that the input validation belongs to a known category of input validation functions;
   obtaining an output from the second machine learning model indicating that the input validation belongs to the known category of input validation functions;
   passing the descriptor through a third machine learning model that analyzes the descriptor to determine the known category of input validation functions to which the input validation belongs;
   obtaining an output from the third machine learning model indicating the known category of input validation functions to which the input validation belongs;
   performing a lookup against a data store to obtain a lookup result corresponding to a suggestion for the known category; and
   transmitting the suggestion for the known category to a destination electronic device.

5. The computer-implemented method of claim 4, wherein the first machine learning model is a binary classifier.

6. The computer-implemented method of claim 4, wherein the second machine learning model is a binary classifier.

7. The computer-implemented method of claim 4, wherein the third machine learning model is a multinomial classifier.

8. The computer-implemented method of claim 4, wherein the categories of input validation include at least one of a data type validation, a validation against a schema, a type conversion check, a range check, a check against allowed strings, a validation of free-form text, a file verification, a content check, a NULL/emptiness check, a comparison check, a membership check, a bounds check, or a location verification.

9. The computer-implemented method of claim 4, wherein a threshold is applied to determine when the descriptor is to be generated.

10. The computer-implemented method of claim 9, wherein external code has a lower threshold for needing sufficient input validation.

11. The computer-implemented method of claim 4, wherein the executing program analysis code includes determining there is a control dependence using the input.

12. The computer-implemented method of claim 4, wherein the executing program analysis code includes determining an absence to a match to a string pattern in a method name that typically indicates a validation is applied to the input.

13. The computer-implemented method of claim 4, wherein the executing program analysis code includes determining the input is not being used as a part of a Boolean expression.

14. The computer-implemented method of claim 4, wherein the descriptor for the input includes an indication of a method that accepts the input, a type for the input, an indication of whether the method is private, and an indication of use of a parameter.

15. A system comprising:
storage to store a code segment; and
a code analysis service implemented by one or more electronic devices, the code analysis service including instructions that upon execution by one or more processors cause the code analysis service to:
execute program analysis code using the one or more processors;
pass the code segment as an input into the executing program analysis code, wherein the executing program analysis code:
analyzes the code segment to determine that the code segment has possibly insufficient validation; and
generates an output comprising a descriptor of possibly insufficient validation within the code segment, wherein the executing program analysis code generates the descriptor based on the input satisfying one or more conditions indicative of insufficient input validation;
obtain, from the executing program analysis code, the output;
pass the descriptor through a first machine learning model that analyzes the descriptor to determine that input validation is needed;
obtain an output from the first machine learning model indicating that input validation is needed;
pass the descriptor through a second machine learning model that analyzes the descriptor to determine that the input validation belongs to a known category of input validation functions;
obtain the output from the second machine learning model indicating that the input validation belongs to a known category of input validation functions;
pass the descriptor through a third machine learning model that analyzes the descriptor to determine the known category of input validation functions to which the input validation belongs;
obtain an output from the third machine learning model indicating the known category of input validation functions to which the input validation belongs;
perform a lookup against a data store to obtain a lookup result corresponding to a suggestion for the known category; and
transmit the suggestion for the known category to a destination electronic device.

16. The system of claim 15, wherein the first machine learning model is a binary classifier.

17. The system of claim 15, wherein the second machine learning model is a binary classifier.

18. The system of claim 15, wherein the third machine learning model is a multinomial classifier.

19. The system of claim 15, wherein the categories of input validation include at least one of a data type validation, a validation against a schema, a type conversion check, a range check, a check against allowed strings, a validation of free-form text, a file verification, a content check, a NULL/emptiness check, a comparison check, a membership check, a bounds check, or a location verification.

20. The system of claim 15, wherein the descriptor for the input includes an indication of a method that accepts the input, a type for the input, an indication of whether the method is private, and an indication of use of a parameter.

* * * * *